(12) United States Patent
Gross et al.

(10) Patent No.: US 7,513,449 B2
(45) Date of Patent: Apr. 7, 2009

(54) WOOD COLLECTION AND REDUCING MACHINE

(76) Inventors: Thomas R. Gross, 1843 Eastern Ave., Weidman, MI (US) 48893; Earl R. Smith, 2409 W. Jordan, Mt. Pleasant, MI (US) 48858

( * ) Notice: Subject to any disclaimer, the term of this patent is extended or adjusted under 35 U.S.C. 154(b) by 513 days.

(21) Appl. No.: 10/237,007

(22) Filed: Sep. 7, 2002

(65) Prior Publication Data
US 2003/0071151 A1 Apr. 17, 2003

(51) Int. Cl.
B02C 13/20 (2006.01)
(52) U.S. Cl. ............... 241/261.1; 144/162.1; 144/172
(58) Field of Classification Search ............. 241/92, 241/93, 101.75, 261.1, 277, 278.1, 293; 144/373, 144/235, 174, 172, 162.1, 278.1, 293; 193/2 R, 193/4–6, 10
See application file for complete search history.

(56) References Cited

U.S. PATENT DOCUMENTS

| | | | | |
|---|---|---|---|---|
| 654,901 A | * | 7/1900 | Lanpher | 193/6 |
| 875,447 A | * | 12/1907 | Miley | 193/4 |
| 2,854,047 A | | 9/1958 | Schmidt | |
| 3,875,984 A | * | 4/1975 | Plough | 144/162.1 |
| 3,944,147 A | | 3/1976 | Pletcher | |
| 3,989,198 A | | 11/1976 | Blasko | |
| 4,009,837 A | | 3/1977 | Schnyder | |
| 4,077,450 A | | 3/1978 | Ackerman | |
| 4,162,769 A | * | 7/1979 | Lapointe | 241/68 |
| 4,260,114 A | | 4/1981 | Herder | |
| 4,738,402 A | | 4/1988 | Downie | |
| 5,005,620 A | * | 4/1991 | Morey | 144/373 |
| 5,209,278 A | | 5/1993 | Carpenter et al. | |
| 5,390,862 A | | 2/1995 | Eglin | |
| 5,692,548 A | | 12/1997 | Bowers et al. | |
| 5,836,528 A | | 11/1998 | Hilgarth | |
| 6,032,707 A | | 3/2000 | Morey et al. | |
| 6,036,125 A | | 3/2000 | Morey et al. | |

* cited by examiner

Primary Examiner—Shelley Self
(74) Attorney, Agent, or Firm—Dean B. Watson

(57) ABSTRACT

A shredder for reducing material which includes a conical cutting drum rotatably positioned within a housing and having an imperforate outer surface so as to carry shredded material radially with and externally of the drum; at least one cutting implement disposed about the outer surface of the cutting drum; an anvil disposed adjacent to the cutting drum; a bellyband wrapping around and conforming to the drum; and a transition interconnecting the bellyband with a discharge port and having a cross sectional configuration that inversely mirrors the cross sectional configuration of the bellyband.

13 Claims, 9 Drawing Sheets

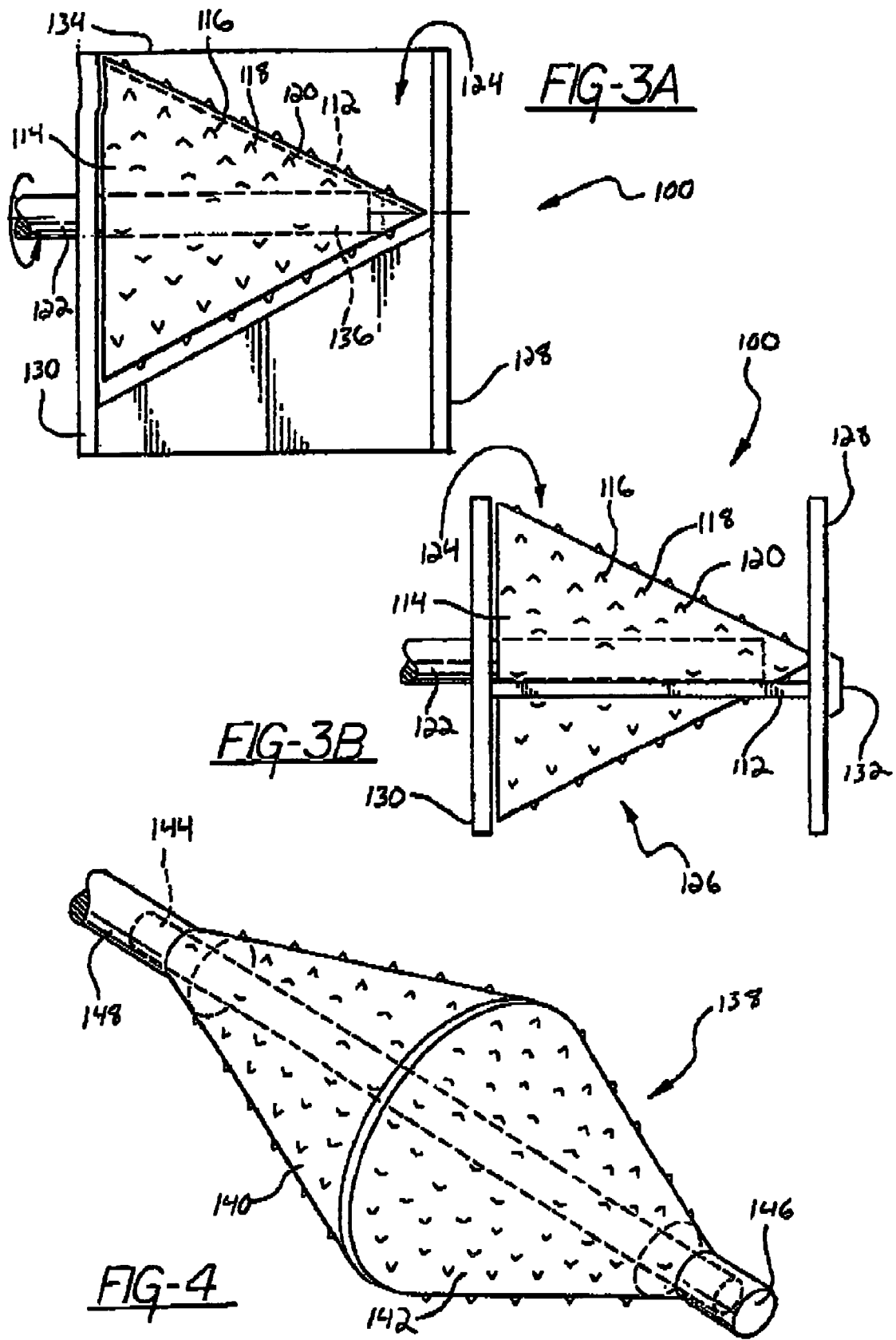

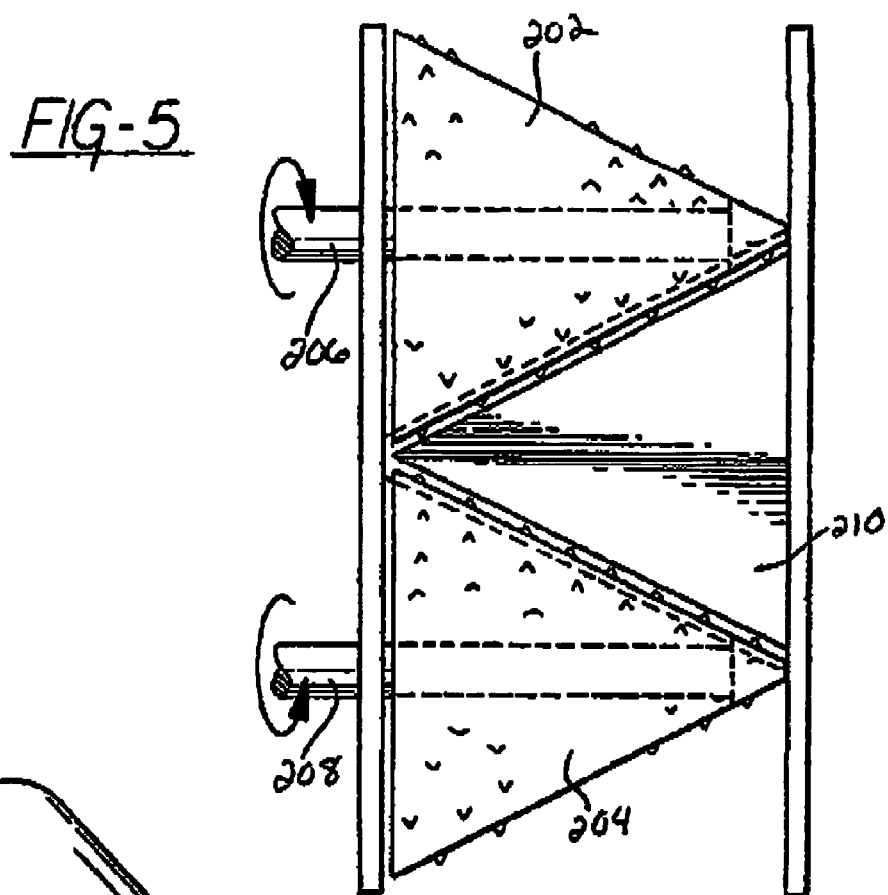
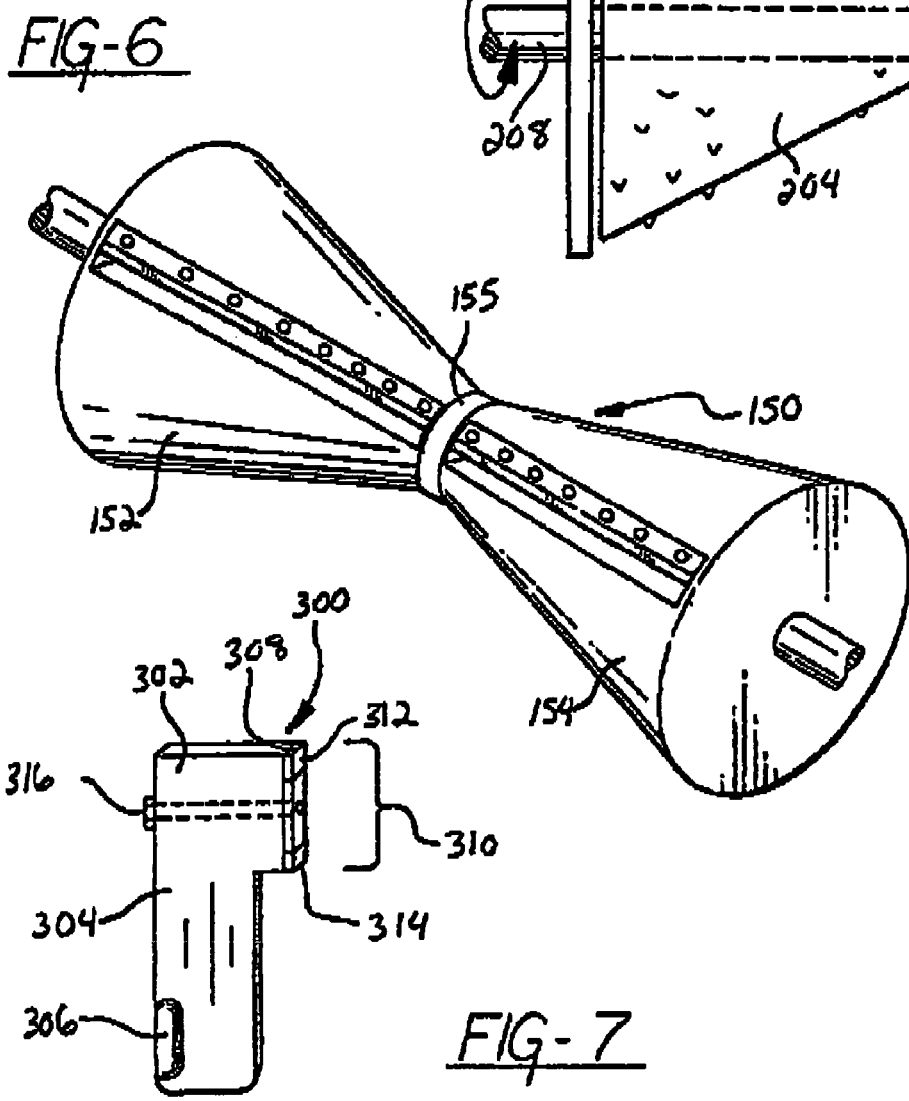

WOOD COLLECTION AND REDUCING MACHINE

CROSS-REFERENCE TO RELATED APPLICATIONS

The present invention relates to, and is entitled to the benefit of the earlier filing date and priority of: U.S. Provisional Patent Application No. 60/269,653, filed Feb. 16, 2001, entitled "Wood Collection and Reducing Machine", U.S. Provisional Patent Application No. 60/286,477, filed Apr. 25, 2001, entitled "Wood Collection and Reducing Machine", and to U.S. Non-provisional patent application Ser. No. 10/076,638 filed Feb. 16, 2002 now U.S. Pat. No. 6,824,089, entitled "Wood Collection and Reducing Machine" to the same inventors hereof, the disclosures of which are hereby incorporated herein by reference.

BACKGROUND OF THE INVENTION

I. Field of the Invention

The present invention pertains to machines for collecting, reducing, compacting and removing wooden materials, and more particularly to drum chippers and shredders.

II. Description of the Background

Urban removal of wood and debris at the curbside is presently accomplished using a number of labor intensive or environmentally unfriendly methods. These methods include burning, bundling at curbside with rope or twine, and collection by city crews using portable shredders.

Burning, although less used today than years past, results in smoke and pollutants being discharged into the air. This method is particularly a problem during days of high pressure which forces smoke to hover at low altitudes and create a nuisance. As a result, burning has been banned by law in many communities.

Most urban collection of wood is currently done by bundling twigs and branches with rope or twine and setting then at the curbside for collection. The bundles are collected by crews, placed in trucks and transported to land fills or compost piles for disposal. One problem with bundling is that compliance with proper collection rules is low. Compliance problems typically arise when people bundle branches in excess of the size or weight designated by collection crews. Problems can also arise when people fail to properly tie the bundles. Bundles that fail to comply with collection rules are typically left at the curbside by collection crews and may sit for weeks thereby becoming an eye sore and a road hazard.

Another method of removing wood debris is with portable high-speed shredders. To remove curbside debris, crews hand-feed branches into a shredder. The hand-fed branches are quickly reduced and blown into the back of a truck, often with the aid of a high-powered blower system. Although this method is fairly effective at reducing wood debris, the method fails in many other respects. First, the method provides an inefficient use of labor, as it requires multiple crewmembers to drive the truck and handle the branches. Secondly, present day chippers and shredders generate large amounts of noise pollution. Excessive noise pollution arises from both the high speed cutting implements and from the high power blower systems. Noise pollution also arises from high speed impacting of the cutting implements upon the material being shredded.

Present day shredders also are very dangerous. When branches are hand fed into rotating high-speed blades, the blades quickly grab and pull the branches. If an operator fails to pay close attention to the job at hand, the operator can be pulled into the shredder and severely injured. Another hazard arises from flying debris. Flying debris occurs from splintered wood being ejected back towards the operator from the high-speed cutting blades. Because of the dangers involved in using high-speed portable shredders, the inefficient use of labor, and the excessive noise pollution generated, methods of urban wood removal are in need of improvement. Furthermore, by improving the reducing efficiency of present day drum shredders, smaller engines can be used to accomplish the same job that used to take larger, less fuel-efficient machines. Therefore, there exists a need for a more efficient drum shredder.

SUMMARY OF THE INVENTION

The present invention addresses one or more of the above mentioned problems and others by providing a shredder for reducing materials that includes a tapered cutting drum having an imperforate outer surface whereby to carry reduced material externally and radially outwardly of the cutting drum. A tapered cutting drum provides a cutting surface with a plurality of cutting speeds and torque to improve cutting efficiency.

In one embodiment of the present invention, the drum shredder includes a housing; a tapered cutting drum rotatably mounted within the housing; an anvil disposed adjacent to the cutting drum; at least one cutting blade disposed about an outer surface of the cutting drum; and a drive connected to the drum to provide rotation.

In another embodiment, the shredder has at least one anvil that cooperates with the at least one cutting blade disposed about an outer surface of the cutting drum to provide a substantially uniform distance along the length of the at least one cutting implement. In a preferred embodiment the anvil is curved.

In one aspect of the present invention, there is provided a discharge assembly for use in a shredder having a tapered cutting drum. The discharge assembly is preferably adapted to accommodate the particular shape of the discharge stream created by the shape of the cutting drum.

In a preferred embodiment of the present invention there is provided a shredder that includes a housing; at least one hourglass shaped cutting drum rotatably supported in the housing and adapted for carrying reduced material externally of the drum interior; at least one cutting implement supported by each bulb of the cutting drum; a double-cupped bellyband at least partially wrapping and conforming to the shape of the cutting drum; and a transition in communication with the bellyband.

For a more complete understanding of the present invention and the various embodiments, reference is now made to the accompanying drawings and following detailed description of preferred embodiments. Throughout the several figures and views, like symbols refer to like elements and where reasonable elements of the various embodiments may be interchangeable, combined, added, or substituted.

BRIEF DESCRIPTION OF THE DRAWINGS

FIG. 3a is a top view of a conical drum utilized in the invention shredder;

FIG. 3b is a side elevational view of the drum of FIG. 3a;

FIG. 4 is a perspective view of a shredder having coaxial conical cutting drums arranged butt to butt;

FIG. 5 is a top view of a shredder having side by side conical cutting drums;

FIG. 6 is a perspective view of a shredder having coaxial conical drums;

FIG. 7 is a perspective view of a cutting blade utilized in the invention shredder;

DETAILED DESCRIPTION OF THE PREFERRED EMBODIMENTS

Figure 1:
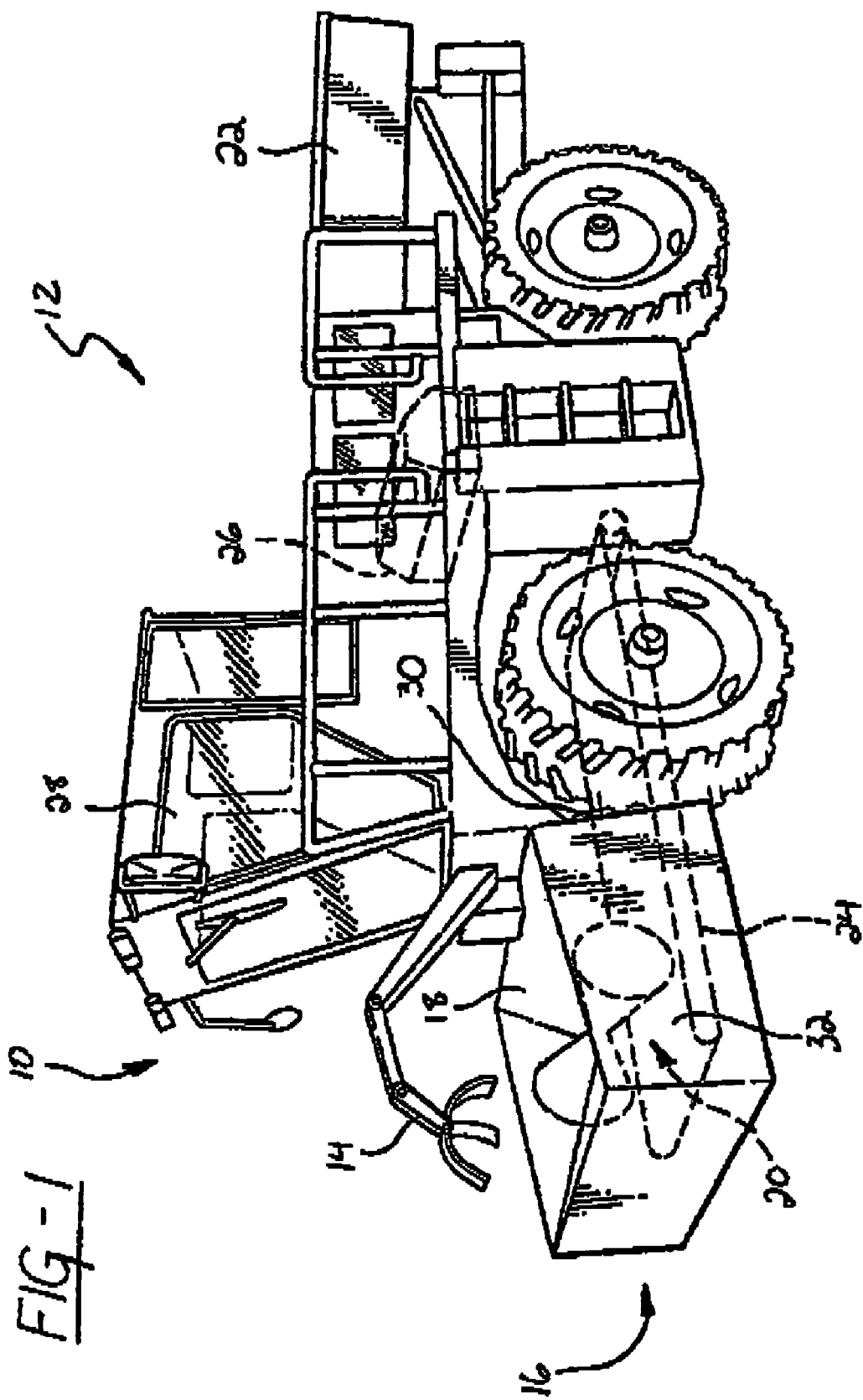
FIG. 1 is a perspective view of a self propelled shredder in accordance with the invention.

Now with more particularity and with reference to FIG. 1, generally depicted therein at 10 is a self propelled embodiment of a machine for collecting and shredding wood.

The machine includes a prime carrier 12; a debris collector 14 operatively attached to the prime carrier 12; and a shredder assembly 16. The shredder assembly 16 has a wood input 18 and an output 20. A storage bin 22 for holding reduced or shredded wood is attached to the prime carrier 12. A conveyor 24 is disposed between the output 20 and the storage bin 22. The conveyor 24 is for moving reduced wood away from the output 20 of the shredder assembly 16 to the storage bin 22.

The prime carrier 12 is a motorized vehicle having an engine 26 and an operator compartment or cab 28. Preferably the prime carrier has wheels, as opposed to tracks, to allow for street travel at posted speeds and for fuel economy. The prime carrier 12 provides support, mobility and may provide power to heavy accessories, including the shredder assembly of the present invention and other accessories. The prime carrier 12 may also have a universal adapter 30 or universal connection, which provides convenient interchangeability of accessories for varied uses. The universal adapter is preferably a ledge or flange that mates with a recess or ledge on the prime carrier and is strong enough for support. Accessories which may be attached via the universal adapter 30 and operated by the prime carrier 12 include: a snow blade or a snow blower for snow removal; a brush sweeper or rotating brushes for street cleaning; rotating rakes for leaf collection; lawn mower for grass cutting, stump grinder, or road grader, etc. Preferably, the prime carrier 12 is adapted for interchangeability of the shredding assembly 16, as described herein, with a leaf collection system, as described in U.S. Pat. No. 6,263,649, entitled "Leaf Gathering and Compressing Machine and Method", by Gross et al., issued Jul. 24, 2001, the disclosure of which is herein incorporated by reference.

The collector 14 is a device for gathering debris, such as wood, brush, twigs, branches etc, and delivering the debris to the shredder assembly. As shown, the collector 14 is a movable arm, such as a knuckle arm, with a grapple. The collector 14 may be controlled electrically or may be controlled with hydraulics. The collector 14 is preferably attached at a front end of the prime carrier 12 and is preferably operated from within the cab 28. By placing the collector 14 at or near the front of the prime carrier, the view of the operator when gathering debris on the ground or at curbside can be substantially improved.

The shredder assembly 16 may be any wood reducing, cutting, or shredding device. The shredder assembly 16 has an input 18 for feeding wood to a reducing or cutting element and an output or discharge 20 for discharging reduced material. Wood reducing, cutting and shredding devices are generally known and include both shredder type and chipper type machines. Suitable shredder assemblies include disk type chippers, drum type chippers, rotor type chippers, shredders, hammer mills, etc. Preferably the shredder assembly 16 is a variable torque, drum shredder, such as one that includes a tapered cutting drum, as described in more detail below or shown in FIGS. 3a-6 and 8, etc. Examples of other types of shredder assemblies that may be adapted for use with the machine 10 of the present invention and attached to the prime carrier 12 include those described in: U.S. Pat. Nos. 5,836,528; 6,082,644; 5,469,901; 4,077,450; 5,692,548; 6,032,707; 5,961,057; 3,436,028, the disclosures of which are herein incorporated by reference.

The shredder assembly 16 preferably has a feed hopper 32 and a low-speed, high-torque cutting implement. A low-speed, high-torque cutting implement reduces flying debris, lowers noise levels, and improves safety. Preferably the low-speed cutting implement rotates about a cutting axis at a speed of less than 1,200 RPM, more preferably at a speed of less than 700 RPM, and most preferably at a speed of 400 RPM or less, but preferably at a speed of 100 RPM or greater. A shredder assembly with a feed hopper 32 and a low-speed, high-torque cutting implement provides an urban debris collection machine with reduced hazards and noise. For example, wood may be placed in the hopper where it can be slowly but continuously shredded as the prime carrier moves from location to location. Because the loading of the shredder can be spaced over intervals, the time between loads allows slower but continuous grinding between collection sites. The slower grinding reduces noise levels and flying debris thereby making the device more suitable for urban collection than present day high-speed shredders, which provide only immediate wood reduction.

The machine 10 may also have a conveyor 24 for transporting reduced wood away from the discharge path of the shredder assembly output 20. The conveyor is disposed between the output 20 and the storage bin 22. Preferably the universal adapter of the prime carrier 12 supports the conveyor 24 so that the conveyor may be used with attachments other than the shredder assembly as described above. Preferably the conveyor 24 is a non-blower conveyor system, such as a screw, band system, roller system or gravity feed chute, or combination of the above, all of which provide transportation of wood chips and debris without the high noise levels typically associated with blower or thrower type systems.

Figure 2:
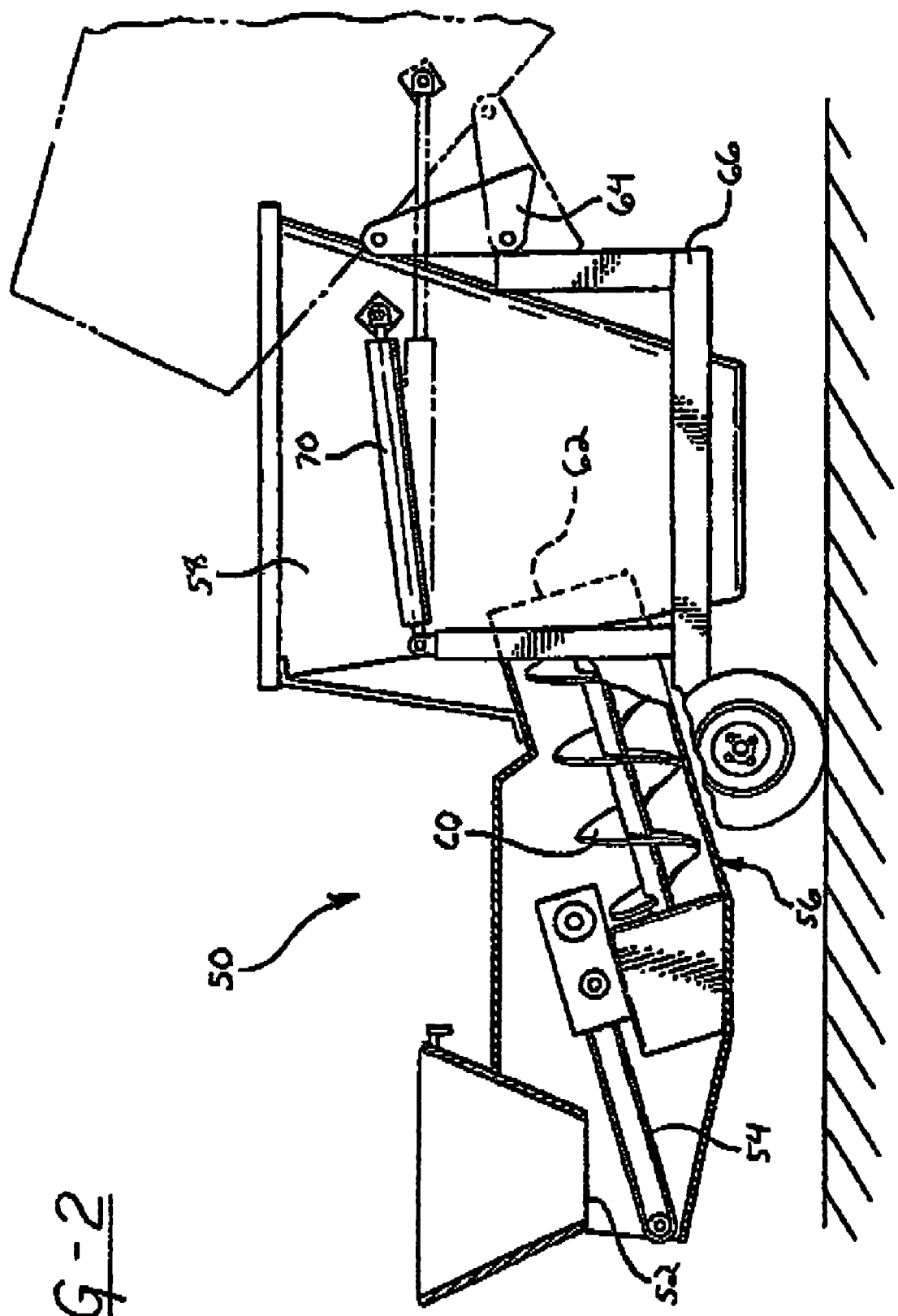
FIG. 2 is a side view of a towable shredder in accordance with the invention.

Referring now to FIG. 2, depicted therein at 50 is a partial, side view of a prime carrier having a shredder assembly output 52, a conveyor 54, a compactor 56 and a storage bin 58. The conveyor 54 is preferably a conveyor band. The conveyor band may have projections or paddles extending from the band for enhancing material movement in the direction of band travel. The conveyor 54 may be in direct communication with the storage bin or may be in communication with other devices which can further process the reduced debris, such as the compactor as described below.

Preferably the machine includes a compactor 56 for compressing debris into the storage bin. The compactor 56 may be integral with the conveyor, such as when the conveyor is a screw; or the compactor may be a system separate from the conveyor. As the storage bin 58 fills, the compactor 56 reduces the volume of incoming material to enhance space utilization.

Preferably the compactor is a screw 60 rotatably mounted downstream from the conveyor 54. The conveyor 54 may be mounted upwardly at an angle to deliver debris to the top of the screw 60. By mounting the conveyor 54 upwardly at an angle to deliver debris to the top of the screw 60, jamming of debris at the output/conveyor interface or at the conveyor/compactor interface can be greatly lessened while at the same time accentuating spatial displacement of the system. The screw 60 collects debris and forces it into the storage bin 58 through an opening 62. Preferably the debris is forced in at a bottom portion of the storage bin 58 or at a point below ½ the volume height of the container. Preferably the opening in the bin is above the very bottom of the bin and may be adjustable, such that the opening can be shifted over a number of locations from the bottom of the bin to about the ½ volume height. By forcing debris into the bin at a bottom portion thereof, enhanced compaction utilizing the force of incoming material against the weight of stored material can be obtained without jamming the compactor. If jamming occurs the opening of the feed can be raised to reduce the amount of compaction. If the amount of compaction desired is greater, the opening can be lowered, towards the bottom of the bin. Hence, compaction can be adjustable.

The storage bin 58 is a container for holding reduced wood and debris. The storage bin 58 is preferably mounted at a back portion of the prime carrier. Mounting the storage bin at a back portion of the prime carrier provides improved operator sight during collection and shredding operations, especially at curbside in urban locations. The storage bin 58 has an opening 62 for receiving reduced material. The opening 62 is preferably provided below the ½ volume height of the storage bin and above the bottom of the bin as described above. The storage bin 58 may also be adapted for dumping or discharging stored material. Dumping may be to the rear or at the side opposite curb. As shown, the storage bin is hinged 64 upon a frame 66 and operatively couple to a series of hydraulics 70 (one of which is shown). The hydraulics and hinge provide means for emptying the bin by dumping reduced material and restoring the bin to the original position. In practice, the prime carrier is driven to a curbside location where removal of wood and/or debris is necessary. From within the cab, an operator activates the shredder assembly, conveyor and compactor, then gathers debris from the curbside using the collector. The gathered debris is dropped into the shredder input or hopper. The debris is slowly reduced and expelled through the output to the conveyor. The conveyor transports the reduced material to the compactor, which in turn moves the material into a lower section of the storage bin. As the storage bin fills, the weight of previously stored material presses against the incoming material to provide compaction. The prime carrier then drives to the next collection site. During travel to the next collection site, wood in the hopper may be continuously, but slowly shredded. When desired, such as when the bin is full, the prime carrier may be driven to a dumping location and emptied. Wood can also be dumped into a packer truck or open top truck at the site to allow the prime carrier to continue operation. Thus, what has been described is an method of wood collection and reduction which is suitable for single person operation along urban streets and roads with reduced noise and improved safety.

The present invention provides a shredder, which may be used with the above collection and reducing system, in a stand-alone system, a tow behind system, etc. The shredder includes a housing; a tapered cutting drum rotatably supported within the housing and adapted for carrying material radially with and externally of the drum. A tapered cutting drum provides improved cutting efficiency. The shredder may also include at least one cutting implement disposed about an outer surface of the cutting drum; an anvil disposed adjacent to the cutting drum; and a drive connected to the drum.

Referring now to FIGS. 3a and 3b, there is generally depicted therein at 100 a shredder for reducing wood in accordance with an embodiment of the present invention. FIG. 3a is a partial top view and FIG. 3b is a partial cross-sectional side view. The shredder 100 has a housing, a drive 122, and a tapered cutting drum 114 supported in the housing and connected to the drive 122. At least one cutting implement 116 (118, 120) is disposed about an outer surface of the cutting drum 114. The shredder 100 may also have at least one anvil 112. The anvil cooperates with the cutting drum 114 to form a cutting region. The anvil is preferably positioned adjacent to the cutting drum to provide an acute cutting angle. An acute cutting angle provides means for capturing and pulling material into the cutting blade(s).

The shredder 100 also has an input 124 and an output 126 where wood or debris may be fed into the input 124, reduced, and expelled through the output 126. The input 124 may be a gravity feed chute. The gravity feed chute may be a collection hopper situated above the cutting drum and suitable for holding debris while the cutting drum/implements/anvil reduce it. The hopper may have substantially vertical walls 128, 130. Substantially vertical walls 128, 130 decrease problems associated with incoming debris bridging over the cutting drum and interrupting the shredding process. If a hopper is provided, the anvil 112 and the cutting drum 114 may form at least part of a floor 132 where debris sits until it is shredded or reduced. Hence, the floor 132 may form part of the shredder that separates the shredder input 124 from the output 126. Alternatively, the input may be a side feed, such as one shown in FIG. 10. If a side feed is provided, feed rollers may be added to the input to regulate the flow of incoming material to the cutting drum and reduce debris fly-back. A curtain or shield may also be provided at the input to the shredder to reduce material fly back. To increase cutting efficiency, the input may have a sloping floor that angles toward the cutting blades for improving material delivery to the cutting implements.

The anvil 112 is a hard object that provides an edge, which cooperates with the one or more cutting implements to reduce material. The anvil may be a simple piece or may be made up of a plurality of pieces. The anvil 112 may be connected to the housing, removably connected to the housing or formed integral therewith. The anvil 112 is disposed adjacent to the cutting drum 114, extendes along the cutting axis, and may be separated from the drum by a gap sufficient to allow drum rotation. As shown, the anvil 112 is a plate, which may be removably mounted to the housing or other support. The anvil(s) may be translatable or movable. By providing a translatable anvil, the distance between the anvil and cutting drum or cutting implements may be adjusted to regulate the size of reduced material.

The anvil may be curved, such as concave, or have a curved edge. A curved anvil or edge allows a tighter tolerance with the cutting implements of a tapered cutting drum. The anvil is preferably curved to provide a substantially even distance or gap between the cutting implements (which may be straight and mounted to a tapered drum) and more preferably along substantially the entire length of each corresponding cutting implement. Thus, if the cutting implements are elongated blades mounted to a tapered cutting drum, the blades will pass in close proximity to the curved anvil, and may act like a scissors, cutting close to the outside first and following along the anvil towards the center.

As may be appreciated, the cutting drum rotates about a center point of rotation. Preferably the anvil is positioned adjacent the cutting drum below the center point of drum rotation. Positioning the anvil adjacent the cutting drum below the center point of drum rotation provides an acute cutting angle. By having an acute cutting angle, a pinch point for pulling material into the cutting implements may be provided that improves cutting and reduces the amount of material being kicked back.

The anvil may be slotless or slotted. A slotless anvil reduces the chance of material becoming lodged at the anvil/cutting drum interface. Alternatively, the anvil may have a plurality of slots or notches to enhance material reduction. The slotted anvil may be matched with a cutting drum having a plurality of cutting blades that mesh with the slots of the anvil. In such case, the slots not only allow a cutting/ripping action but also provide a breaking action. Thus, the anvil may not only provide means for adjusting the size of reduced material, but may also provide an enhanced reducing mechanism.

To affect material reduction, the shredder includes a cutting drum. The cutting drum has two ends and a middle section. The cutting drum is preferably tapered, such as a tapered cylinder. The cutting drum preferably tapers towards the middle section, which may give the drum an 'hourglass' shape, but may alternatively or additionally taper towards one end, both ends, towards the center, or any combination of the above. A tapered cutting drum provides a plurality of cutting radii with increasing torque along the cutting axis, and also provides a plurality of increasing cutting speeds along the cutting axis to improve cutting efficiency.

The cutting drum is preferably adapted to radially carry chips on the outside of the drum and as such may be imperforate so that chips may not pass radially inwardly through the conical outer wall of the drum. The drum may be adapted for carrying chips radially in any suitable manner, such as having a drum with a solid, small holes which are impenetrable or continuous outer surface, having extended blades, and/or by providing a plurality of pockets for carrying chips. Each pocket may be associated with a corresponding cutting implement. As shown, the pockets are elongated radially outwardly opening depressions or cups that have a set of walls and a floor. Each pocket presents a concave radially outwardly facing cross sectional configuration so as to trap chips on the outer surface of the drum and precludes the passage of chips radially inwardly through the conical walls of the drum into the interior of the drum. In a preferred embodiment each pocket is disposed prior to the associated cutting implement (as measured in relation to the cutting blade and direction of drum rotation) and extends about the same length as said implement. Preferably the cutting drum has a substantially uniform, smooth outer surface, other than the cutting blades, associated hardware, and pockets. The cutting drum may be hollow, solid, or essentially solid, but is noted and not withstanding that the pockets present an imperforate outer conical surface so that chips are carried on the outsied of the drum and are precluded from passing radially inwardly through the drum The drum may be made of cast alloy, forged machine steel, cast iron, other hard materials, etc. Alternatively, the cutting drum may be formed with a plurality of concentric disks of narrowing radii grouped together, which may be formed of solid cast alloy, forged machine steel, cast iron, other hard material, etc. The concentric disks may have a center hole adapted to fit upon a shaft. The disks may be pinned to the shaft to fix them in place. The shaft in turn can be fixed to a drive. Forming the cutting drum with a plurality of concentric disks allows for ease of manufacture, especially for large cutting drums, which may be heavy and difficult to otherwise handle. The disks may be combined like a series of dumbbells of different diameters. The disks may form a series of steps or may form a gradually tapering surface. The drum itself may be hollow, solid or essentially solid. A solid or essentially solid cutting drum provides a heavy member for increased stability and may also provide a flywheel effect with increased momentum so that chipping large branches does not hamper the cutting blade(s). A solid cutting drum, or one with concentric disks, may be milled or welded to provide mounts for fixing cutting implements in place. The cutting drum may be hollow or have a hollow center or center portion. A hollow drum allows for making a larger cutting piece with reduced weight, which may provide ease of handling. A hollow center may also be used for fixing a drive shaft therein. Alternatively, the drum and the shaft may be a one-piece milled head and shaft.

The cutting drum is connected to a drive 122. The drive 122 provides rotation and power to the drum 114. The drive 122 may include a drive shaft and a power source. The drive shaft may be connected to the power source by any suitable means, which may include a flywheel or other device. The drive shaft is preferably connected to an inner, tapered portion 136 of the drum. The drive shaft may be connected to the most tapered portion of the drum, but is preferably connected within 40% of the most tapered portion, more preferably within 25% of the most tapered portion, and most preferably within 10% of the most tapered portion. By connecting the drive shaft to a tapered part of the drum 114, torque can be increased. A stub shaft disposed at an end opposite the drive shaft may further support the cutting drum. The stub shaft may be supported by any suitable means, such as by the housing. The stub shaft may be journalled to a bearing and is used to provide additional support for the cutting drum.

The cutting drum has at least one cutting implement. The cutting implement may be any suitable reducing device, which may be selected based on the particular shredding operation being performed. Suitable cutting implements include, blades or chisels, spikes, hammers, etc. In one embodiment, the cutting implements are elongated blades disposed about the outer surface of the drum. Elongated blades or chisels are good cutting implements for wood. In another embodiment, the cutting implements are small incisors, such as small chisels, short blades, hammers or spikes. Small incisors, such as those shown in FIG. 3*a*-3*b* at 116, 118, 120, may be good cutting implements for wood, but may also be good for shredding rubber, appliances, tires, soft metals, etc. The small incisors may be incrementally staggered about the drum surface to permit the pulling of debris toward a higher torque-cutting radius. The pattern of the cutting implements on the drum may be a reverse screw or screw type pattern. Preferably, each incisor extends about 50% or less of the possible cutting axis or length of the cutting drum, more preferably extends about less than 20% of length of the cutting drum, and most preferably less than 10% the length of the cutting drum. Hence, each cutting incisor cuts or impacts along a relatively small portion of the drum length (or cutting plane), as opposed to a long, single blade that may extend the length of the cutting drum. By having relatively small cutting implements, which do not extend along the entire length of the drum, a low speed, high torque cutting drum can be provided that has a greater localized impact.

Referring now to FIG. 7, shown therein is an embodiment of a cutting implement in accordance with the present invention depicted therein at 300. The cutting implement forms a hammer 300 with a head 302 and a body 304. The body 304 may be cylindrical and may have a depression 306 for engaging a setscrew to fix the hammer 300 to a cutting drum. The head 302 has a sharp upper edge 308 for cutting wood or reducing other material. The sharp upper edge 308 may be provided by a plate 310. The plate 310 may be square or rectangular, but may be any shape that matches a front portion of the head 302 such as rounded or pointed. The plate 310 is preferably rotatable with a first sharpened edge 312 at the top of the plate and a second sharpened edge 314 at the bottom of the plate. A rotatable plate with at least two sharpened edges allows the first sharpened edge, which has been dulled by use, to be quickly exchanged with a second sharper edge by simply loosening the plate and rotating the first edge out of position. As shown, the plate 310 is fixed to the head 302 with a bolt 316 that extends through the back of the head to engage and secure the plate in place. The hammer is preferably removably seated within the cutting drum and extends above the surface thereof.

Figure 8:
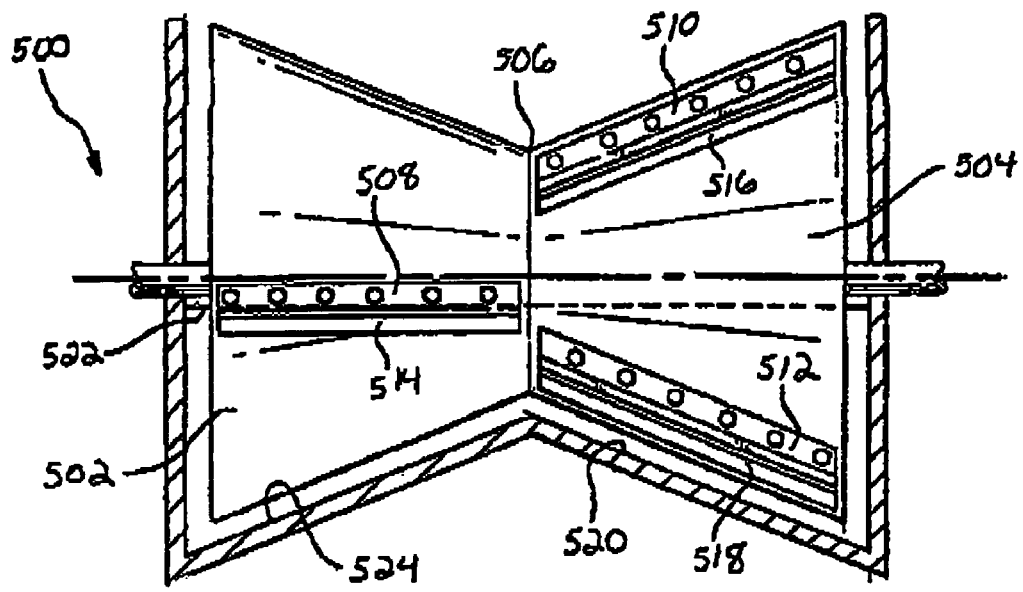
FIG. 8 is a cross section view of a cutting drum with a discharge assembly including a bellyband.

In another embodiment, as shown in FIGS. 6 and 8, the cutting implement(s) is(are) provided as cutting blade(s) 508, 510, 512. A cutting blade(s) is (are) a long knife(s) or chisel(s) that extend(s) longitudinally along the cutting axis of the cutting drum. Each blade may be connected to the cutting drum at an acute angle relative to the surface thereof to enhance chipping and material draw into the shredder. Preferably each cutting blade extends at least 50% of the length of the cutting zone, more preferably extends at least 90%, and most preferably extends substantially the entire length of the cutting zone, e.g. the exposed cutting region or section of a drum, cone or cutting plane, i.e. plus or minus a few inches. The cutting blade may by straight or curved with a straight or curve edge. Each cutting blade may have multiple edges so that the blade may be repositioned to provide a fresh, sharpened edge. Each cutting blade may be formed by combining multiple, smaller blades together, such as providing a number of smaller blades adjacent to one another, which gives the appearance of a single blade, but allows sections of the blade to be replaced independent of other parts.

The drum shredder may include more than one cutting drum. When more than one cutting drum is provided, the drums can be positioned in a multitude of arrays, such as those shown in FIGS. 3a-6, in parallel, or in series, (i.e. one next to the other; one across from the other; or both). By having more than one cutting drum, a larger cutting surface with increased shredding efficiency can be provided.

Referring now to FIG. 4, depicted therein at 138 is a preferred embodiment of a shredder having multiple cutting drums 140, 142, wherein the first drum 140 is mounted coaxial with the second drum 142. The drums may be tapered, like a set of cones or frustums. The drums 140, 142 are preferably attached to one another, and more preferably butted together. By butting tapered cutting drums together, a compound cutting angle can be provided to give increased cutting efficiency. The drums 140, 142 may be positioned butt-to-butt or nose-to-nose, with each drum or region providing a cutting zone with a different cutting angle. The drums 140, 142 may share a drive 144 that includes a drive shaft, which may be housed in a drive shaft tube 148 for protecting the shaft against damage from incoming debris. A stub shaft 146 may also be used to support the drums 140, 142.

Alternatively, as shown in FIG. 5, or additionally, multiple drums may be provided and arranged side-by-side. Multiple drums 202, 204 that are mounted side-by-side provide an increased cutting area. Multiple drums 202, 204 may be powered by the same or by separate drives 206, 208. The separate drives may rotate the drums in the same direction or in opposite directions, as desired. Any void space not directly contacted by the drums, such as on the floor, may be filled by an inclined island 210 or wall. The island 210 preferably tapers at the top and slopes downward toward the edge of the anvil to guide material towards the cutting implements of the cutting drum.

Referring now to FIG. 6, depicted therein at 150 is a preferred embodiment of a cutting drum formed by multiple cutting cones 152, 154 positioned co-axial and nose-to-nose to form an 'hourglass' shape. A spacer 155, such as a short drive shaft or rod, may separate the cutting cones 152, 154. Each cutting cone 152, 154 preferably has at least one cutting blade disposed along an outer surface thereof, but may alternatively have two, three or more cutting blades each. By adding more cutting blades, the rate at which material is drawn into the shredder can be increased. Each cutting blade may extend substantially the entire length of each respective cutting region or cone. Alternatively, a plurality of short cutting blades may be staggered around the drum and over the cutting region to cover the entire cutting zone. The blades on each cutting cone may also be mounted on the same cutting plane as the blades of the adjoining cutting cone or the blades may be staggered.

Referring now to FIG. 8, depicted therein at 500 is a drum shredder having a cutting drum 506 in accordance with another embodiment. The cutting drum 506 is hourglass shaped and includes a set of bulbs 502, 504 fixed together at their respective nose or narrow ends, which in turn forms a single drum 506 that tapers at a middle section. Preferably, the drum tapers evenly on both halves towards the center so that the drum is balanced. The angle of the tapering is preferably wide enough to accommodate branches having a desired diameter. The angle created between the bulbs by tapering of the drum is preferably at least 90 degrees. By having a wide angle, large objects can be ground by the center of the drum without the sides stopping the object. Each bulb 502, 504 has at least one cutting blade 508, 510, 512 disposed along an outer surface thereof, but may alternatively have two, three or more cutting blades each. Each cutting blade preferably extends substantially the length of each respective cutting region or drum section. The cutting drum is preferably adapted for radially carrying chips on the outside of the drum. Each cutting blade preferably has a pocket 514, 516, 518 associated with it for carrying reduced material. The pockets are disposed in the outer surface of the drum so as not to violate the impenetrable nature of the drum. The drum shredder may also include a discharge assembly for carrying reduced material away from the shredder. The discharge assembly preferably includes a bellyband 520 that conforms to the shape of the cutting drum 506. The bellyband provides a cavity for carrying reduced material. The bellyband preferably wraps the cutting drum beginning at about the anvil and extends to at least the bottom most portion 524 of the cutting drum 506.

In practice, wood is collected and placed in the in-feed where it is contacted by blades rotated fixed to one or more rotating cutting drum(s). Lighter materials are quickly shredded by the impact of the blades. Reduced material passes between the gap provided by the anvil and the cutting drum and is discharged through the output. Heavier branches will tend to move progressively along the incline of the tapered cutting drum to a higher torque portion thereof, which may be aided by gravity, by the design of the cutting blades, the configuration of the cutting drum, or all of the above. The high torque, slower speed region of the tapered cutting drum can then be effectively utilized to reduce large branches with improved efficiency, even at a slower speed.

It is often desirable to discharge shredded material, such as wood chips, a distance away from the shredder. It may therefore be desirable to include in the shredder a discharge assembly adapted to collect and distribute reduced material in a somewhat controlled manner. In the case where chips are radially carried with the cutting drum, it may be desirable to maintain the speed of those chips for as long as possible while controlling their direction. It may also be desirable to narrow the discharge stream so that it can be more accurately deposited. This control may be accomplished with a shredder having a discharge assembly adapted to accommodate the particular shape of the discharge stream produced by the cutting drum.

The discharge assembly may include a bellyband and/or a transition. A bellyband is a housing that substantially conforms to the shape of the cutting drum to allow chips to be carried radially with the cutting drum during operation. In a preferred embodiment the bellyband is adapted to conform to the shape of a tapered cutting drum. The transition is a housing that allows chips to be guided away from the cutting drum. The transition may be formed by a series of walls that provide a cavity for carrying shredded material. The transition may begin at a point where the distance from the cutting drum in which material is carried increases. This increased distance may be measured in comparison to the distance provided between the bellyband and the drum, which may be substantially uniform. The transition preferably tapers along a length up and away from the cutting drum to help funnel shredded or chipped material into a narrower stream.

In a preferred embodiment the transition is adapted to receive reduced material from a tapered cutting drum. When a tapered cutting drum is used, various problems associated with handling the discharge stream can occur. For instance, reduced material can come off the tapered drum at multiple angles and speeds. Material coming off the drum at different angles or different speeds can cause back feeding of the material into the drum resulting in clogging. For instance, in the case where the cutting drum is hourglass shaped, when the cavity in which material is carried begins to open, chips depart from the drum in two major, outward angles. Chips departing at the outer ends of the drum can collide with the walls of the transition. Reduced material may also come off the drum at different speeds, for instance, material following along a smaller diameter portion of the drum (the center) will be traveling at an overall slower speed than material traveling along a larger diameter portion of the drum. The slower speed material may hit the center of the transition and bunch, resulting in poor discharge. Thus, it is believed that if the transition is too restrictive or not properly angled, material can cluster in the housing and back feed into the cutting drum, resulting in a weak discharge stream. However, simply increasing the overall volume of the transition may not allow for effectively narrowing the discharge stream. To correct for poor chip discharge, the shape of the transition can be adapted to substantially conform to the shape of the discharge stream to improve over-all flow. This may be accomplished by providing a transition, which includes a higher entry where reduced material is discharge at a slower speed, and/or includes a larger cavity where reduced material is discharge at a slower speed.

Figure 9:
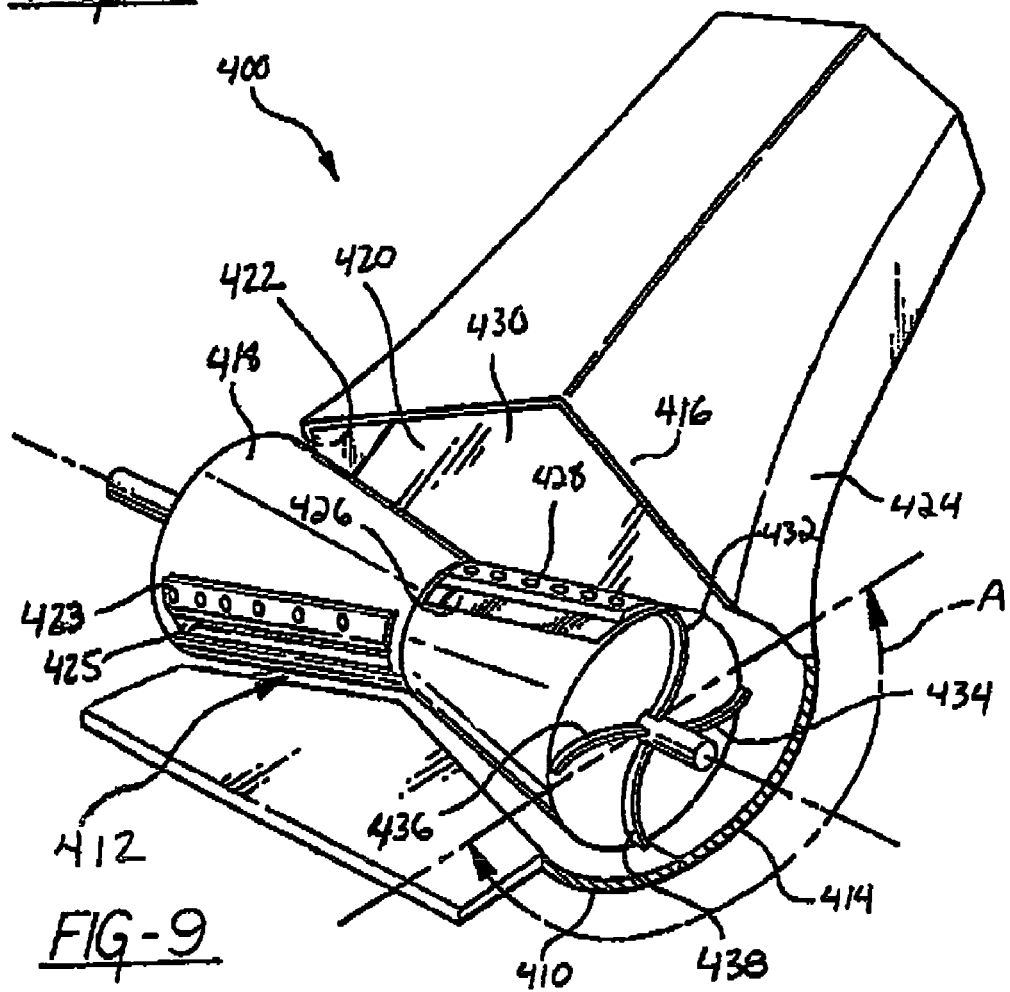
FIG. 9 is a perspective view of the cutting drum and bellyland of FIG. 8, further including a transition.

Referring now to FIG. 9, depicted therein at 400 is an embodiment of a shredder with a discharge assembly for allowing chipped material to be radially carried with the cutting drum and expelled from the shredder. The discharge assembly 400 includes a bellyband 410 which forms a space that is in communication with the chipping zone 412 or material/blade contact plane; a transition 414 in communication with the bellyband 410; and a discharge port (not shown) in communication with the transition 414.

The bellyband 410 follows the surface of the cutting drum 418 in close tolerance to allow chips to be carried radially with and externally of the drum. The bellyband guides reduced material into the transition 414. In this embodiment, the bellyband 410 preferably begins adjacent to the anvil 420 and follows an arc A around the cutting drum 418. The arc A is defined as beginning where chipping takes place (the material/blade contact plane or at the anvil), which is defined as 0 degrees. The point or plane of the arc A directly opposite the cutting point is then defined herein as 180 degrees. The bellyband preferably extends or wraps the drum beginning at the anvil to at least the bottom most portion of the drum.

The bellyband preferably conforms to the shape of the cutting drum. In a preferred embodiment hereof, where the cutting drum is tapered, the bellyband is cupped with a wider region and a narrower region to conform with the shape of the tapered cutting drum. In the case where the cutting drum is tapered towards the middle or towards both ends, the bellyband may be cupped and formed with a multi-sided, and/or multi angled front wall that conforms to the angle of the tapered drum. For example, if the drum is 'hourglass' shaped, the bellyband will have a double-cupped housing or wall to accommodate the shape of the hourglass cutting drum. The double-cupped bellyband may have a wider outer region and a narrower inner region to accommodate the bulbs of the hourglass. The space between the bellyband and the cutting drum is preferably uniform or substantially uniform along the length and width of the bellyband. The clearance of the bellyband from the cutting implements is preferably small, such as ⅛th of an inch or less and more preferably 1/16th of an inch or less. A small clearance of uniform dimension allows chips to be effectively carried radially with the drum. The bellyband extends to a point where the clearance from the drum increases, or where the cavity opens from the drum. At the point where the clearance from the drum increases, chip separation from the drum is effected. The bellyband may therefore extend to any point on the drum where it is desirable to begin chip discharge. The bellyband preferably wraps the circumference of the cutting drum 418 at least 90 degrees, but may be along less than 180 degrees, along less than 135 degrees, along less than the 120 degrees and along less than 95 degrees of the arc A. In relative terms, the bellyband preferably extends to a point (or plane) of the arc that includes the lowest point of the cutting drum. By having a bellyband that extends along less than 180 degrees, chip discharge from the drum can begin at an earlier point to provide a more horizontal chip discharge trajectory of the discharge stream, which may help reduce chip collisions in the discharge assembly.

The transition 414 is a housing that allows chips to be guided away and/or upward from the cutting drum and/or from the bellyband to be eventually discharged from the machine. The transition begins at a point where the distance from the cutting drum increases over that of the bellyband. The transition 414 preferably tapers along its length to a discharge port (not shown), which may be circular, ovular, square, rectangular, etc. The transition may also connect to an extension chute that may allow further control of the discharge stream. The transition 414 may be attached to the shredder by any suitable means, such as connected to the bellyband 410 or any other suitable structure, such as the housing. As shown, the transition can include a series of walls, such as sidewalls 422, 424, a front wall 420 and a rear wall 416. The sidewalls 422, 424 of the transition may be slanted away from the cutting drum and may be slanted inward and upward so as to ultimately intersect at an imaginary point above and forward of the cutting drum. Proper slanting of the transition allows for effective narrowing of the discharge stream without too much loss in momentum. The initial cross-sectional volume of space created by the transition is preferably greater than that of the bellyband. The front wall 420 and rear wall 416 may be attached to sidewalls 422, 424. The frontal wall begins near where the bellyband ends, such as the bottom most point of the cutting drum 418 in this embodiment or anywhere along the circumference of the cutting drum as otherwise desired. The frontal wall 420 preferably extends forward and upward with the sidewalls, gradually tapering so as to intersect at the same imaginary point above and away from the cutting drum as the sidewalls. The rear wall 416 is the wall above and opposing the front wall 420. The rear wall 416 is preferable shaped to inversely conform to or mirror the shape of the cutting drum. The rear wall preferably forms an extended void 430 after the bellyband. The extended void may be provided by an entry having a higher portion, a cavity having a larger portion, or an angular entry formed to accommodate the discharge stream with a portion higher than would otherwise be provided by a plane normal to the sidewalls. The higher portion of the entry or larger portion of the cavity is preferably provided where reduced material is discharged at a slower speed from the cutting drum. Extended void 430 may be provided by an angular rear wall, multi-sided rear wall, such as circular, two-sided, three-sided, or more. For example, where the cutting drum is tapered toward the center of the drum, the rear wall may be inverted 'v shaped' to create a void conforming inversely the "v" shaped angle of the hourglass shaped cutting drum. The rear wall may be formed by a 2-panel assembly, angled upward and away from the cutting head to create an entry space with an extended multi-angular or 'v-shaped' void for chips that are discharged from the center of the tapered cutting drum to enter. The "v-shaped" void may be part of a non-uniform entry, such as a pentangular or pentagonal entry, or may be part of a uniform entry where the front wall parallels the shape of the rear wall. The front and rear walls may be ultimately enjoined by inclined sidewalls and may terminate at a discharge port. The discharge port is the exit of the transition. The discharge port is preferably provided at a point of 5" to 10" below the intersection point of the side walls and most preferably about 8" or more below the intersecting point of the side, front, and rear walls.

To aid in chip discharge, the cutting drum 418 preferably has at least one fan blade 432 attached to the cutting drum. Preferably, the cutting drum has 3 or more blades 432, 434, 436, 438 disposed on each outer drum section (one section of which is shown) to aid in chip discharge by providing airflow through the bellyband and into the transition.

As may be appreciated, the drum shredder 400 with a tapered cutting drum 418 has a plurality of cutting regions with varying distances from the input. The first cutting region has a speed faster than the second cutting region. The second region has a higher torque than the first region. In the case where the cutting drum tapers inwardly toward a middle section, the first region angles inward toward the second region in the direction of material feed so that material will tend to contact the outer regions of the drum first, as it has a greater radius and is positioned closer to the shredder, input. As material is shredded, it is pulled inward by the action of the cutting blades and the angle of the cutting surface to a second cutting region of higher torque. Wood chips are produced at the cutting zone by the cutting blades and the anvil. The wider region of the cutting drum (that with a larger diameter) provides a cut that is straighter than the cut provided by the narrower region (that which has a smaller diameter) of the tapered cutting drum. The narrower region of the cutting drum in turn provides a cut that is more cupped or curved than that produced by the wider region of the drum. Thus, a tapered cutting drum provides a compound cut, or has a compound cutting angle as the wider regions of the drum contacting the material cut more down and through the material, while the inner more narrow regions of the drum, which pass by the anvil(s) after the wider regions, act more to chisel and scoop the material. This compound cutting provides enhanced draw and improved cutting efficiency.

Reduced material is carried radially with and externally of the drum. The reduced material may be dropped straight down or can be carried in the space between the bellyband and the surface of the cutting drum. The chips may be carried in one or more pockets 425, 426 disposed in the cutting drum adjacent each cutting blade 423, 428. In the case of the hourglass drum, the shape of the bellyband works to contain the two or more major chip steams to enhance forward directional momentum by reducing chip collisions. The chips exit the cavity of the bellyband 410 away from the drum into the transition 414, which may be aided by the one or more fan blades that follow with the rotation of the cutting drum. The extended void 430 (for example, may a higher entry at the center of the transition) receives the reduced material from the bellyband. The extended void allows reduced material traveling in the center of the drum time and/or enough distance to be accelerated with the rest of the discharge stream without substantial back feed into the cutting drum.

Figure 10:
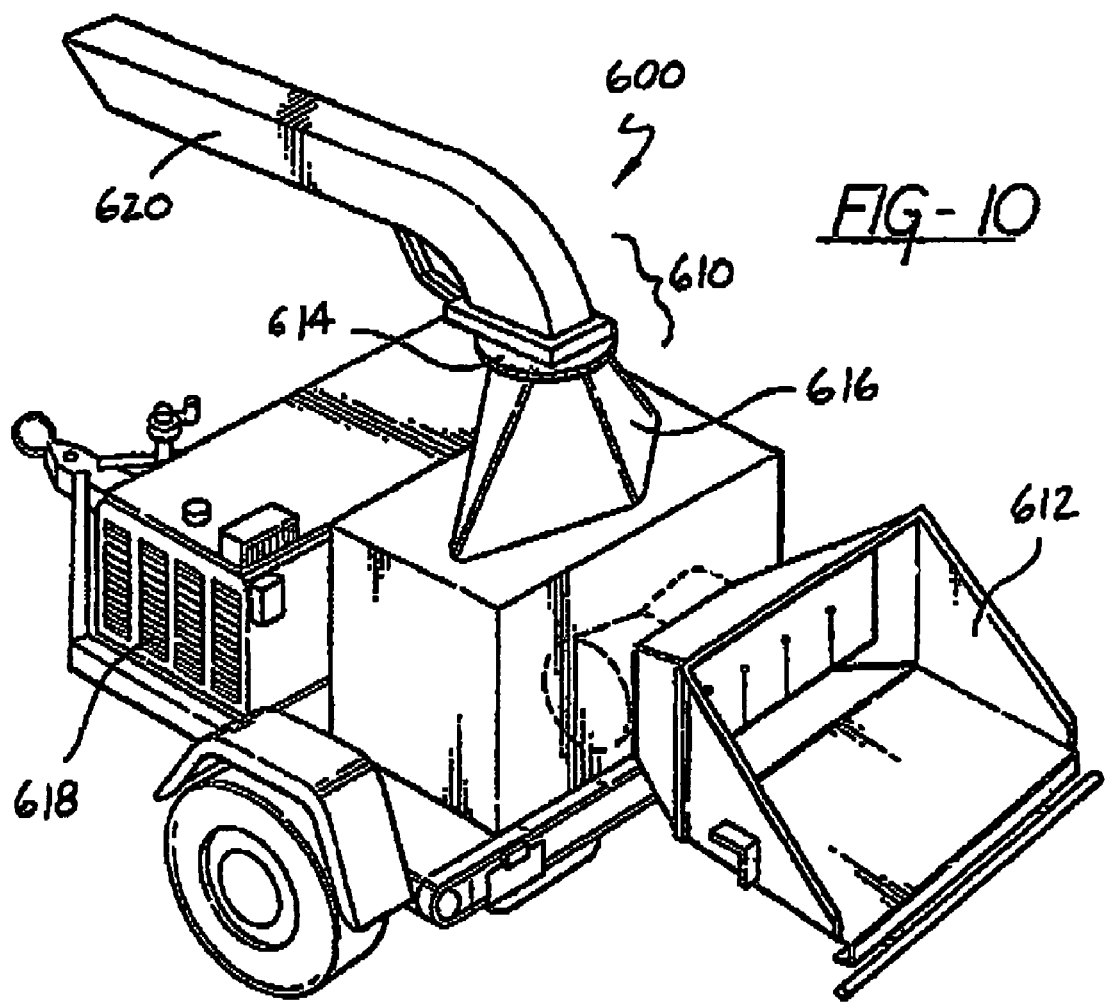
FIG. 10 is a perspective view of a further, towable shredder in accordance with the present invention.

Referring now to FIG. 10, depicted therein at 600 is an environmental view of an embodiment of a shredder with a discharge assembly 610 for allowing reduced material to be radially carried with a tapered cutting drum and expelled from the shredder. The shredder includes an in-feed 612, at least one cutting drum 622 (shown in phantom), a transition 616 adapted for receiving reduced material from the cutting drum, and a discharge port 614. The cutting drum is coupled to a drive, which may be propelled by any suitable power source 618, such as a motor, hydraulic drive, diesel engine, etc. Wood taken in through the in-feed 612 is reduced by the cutting drum and radially carried between the outside of the cutting drum to the transition 616. The transition 616 narrows the discharge stream, and may connect to an extension chute 620. An extension chute provides means for controlling the direction of the discharge stream, such as into the back of a truck. The extension chute 620 may be rotatably coupled with the transition 616 to allow the direction of the discharge stream to be changed. The extension chute 620 may be translated by any suitable means, such as by gears, bearings, chain and sprocket, etc. The shredder 600 may also be adapted with a hitch for towing behind a vehicle.

Figure 11:
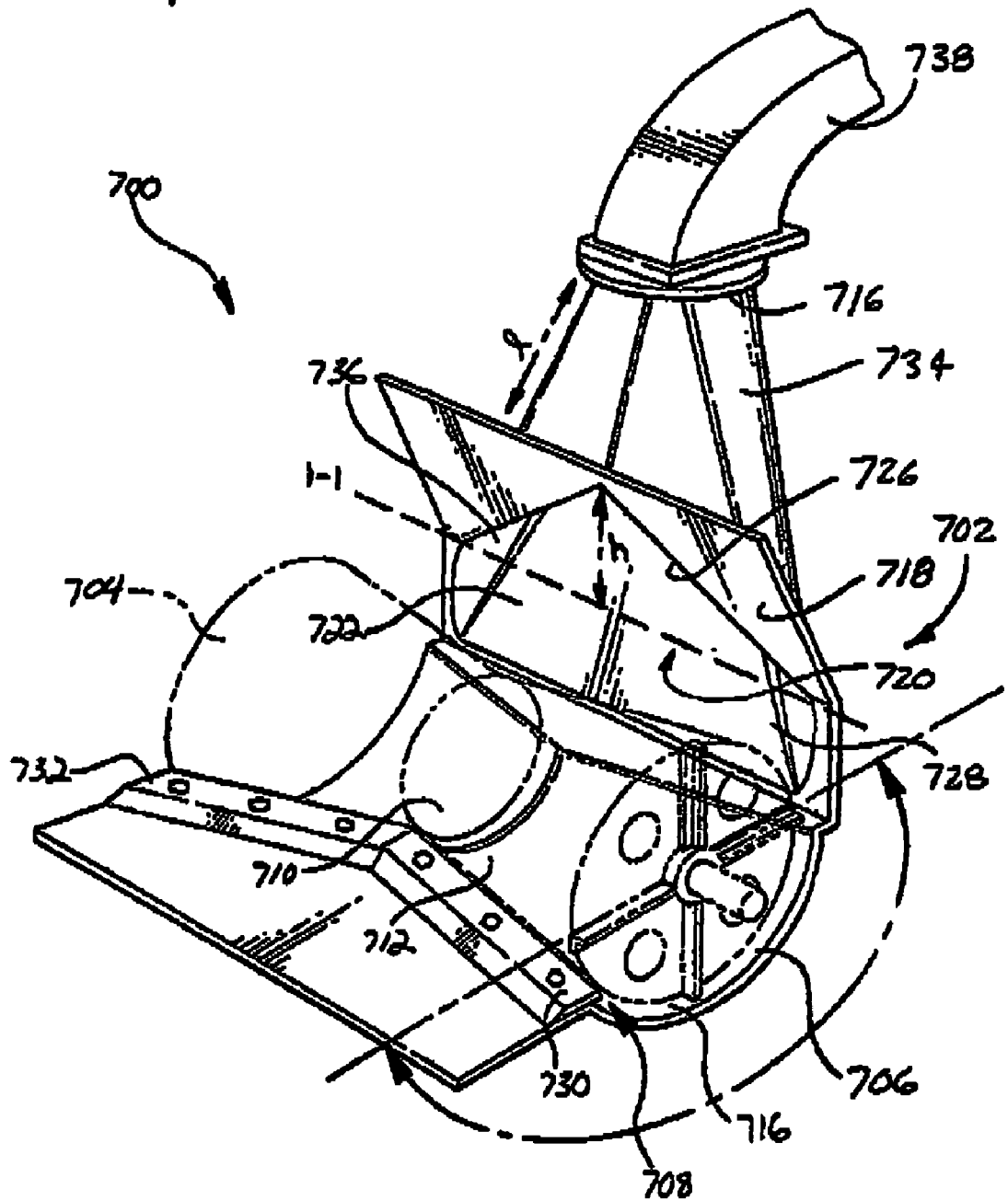
FIG. 11 is a perspective view showing a modified discharge assembly.

Referring now to FIG. 11, shown therein at 700 is a shredder that includes a discharge assembly 702 in accordance with the present invention that is adapted to be used with a tapered cutting drum 704 (shown in phantom). A plurality of anvils 730, 732 may be disposed adjacent to the cutting drum to aid in material reduction. The anvils may be straight, but preferably have a curved edge. The discharge assembly 702 includes a bellyband 706 that conforms to the shape of the cutting drum. The bellyband provides a cavity 708 for receiving reduced material produced by the cutting implements/anvils. As shown, the bellyband 706 is double cupped with narrower regions 710, 712 towards the center and wider regions 714, 716 towards the outside. The discharge assembly 702 may further include a transition 718 in communication with the bellyband 706. The transition 718 provides a housing that includes an entrance 722 and a discharge port 716. The transition's entrance is preferably adapted to accommodate the discharge stream coming off a tapered cutting drum. The transition preferably has a higher entrance (h) where reduced material is discharge at a slower speed from the cutting drum. A transition having a higher entrance where reduced material is discharge at a slower speed from the cutting drum allows material discharged at slower speeds time/distance to integrate into the major direction of the discharge stream without degenerative back feeding into the cutting drum. A transition having a higher entrance where material leaves the drum at a slower speed may be provided by any suitable means, such as by a cavity with a non-uniform cross section in the width/height direction, by an angular rear wall, by an angular rear wall and an angular front wall, by a multi-angular entrance with a shape other than rectangular or square, by a non-uniform cavity, by an extended void, e.g a void that extends from and/or beyond a plane normal to the side-walls (shown in part by line segment 1-1), etc. The entrance preferably has a cavity 720 greater than that of the bellyband and preferably tapers up and away from the drum.

The transition 718 may have a cavity 720 with a non-uniform cross-section or non-uniform area across the width/height thereof. Having a transition with a cavity 720 that is non-uniform in cross-section allows enough distance and/or time for material traveling at either slower speeds or at different angles to integrate with the major discharge flow(s). The transition may have a larger cavity where slower material may be generally released from the cutting drum. It is possible that when a slower discharge stream is injected into the transition, collisions can occur with faster material. By adapting the transition with a proper opening or cavity, contact with the draft provided by faster material or by the faster material itself, may permit the slower material to be accelerated to a speed faster than when initially released from the drum. The transition preferably tapers, e.g. has a decreasing volume along its length (l) for narrowing the discharge stream. A tapering transition with may allow material to be accelerated to create a strong discharge stream.

The transition may include an angular back-wall 726. An angular back can provide an entrance with a higher portion and/or a cavity that is larger towards certain parts of the transition than others. An angular back wall may also/or alternatively provide an entrance with an extended void, e.g. a region with a greater distance or a greater height than other parts in which reduced material can travel before colliding with the rear wall. The transition may also include side-walls 734, 736 and a front wall 728. The angle of the walls may be adjusted to allow some debris to be deflected at an obtuse angle up and into the transition, which may act to further limit material from back feeding into the cutting drum. In an alternative embodiment where the transition is used with a drum that tapers toward the outsides, the transition may be formed with a cavity that has a height or volume that is greater towards the outside regions of the transition than towards the center of the transition.

The transition may end at a discharge port 716. The discharge port 716 may be connected to an extension chute 738. An extension chute 738 allows the direction of the discharge stream to be changed, such as side-to-side or up and down. In certain embodiments (such as with the hour-glass drum) reduced material may be expelled from the bellyband in at least two major discharge streams. The discharge streams may have at least two different major discharge directions or angles. Reduced material may also be traveling at various speeds. By using a discharge assembly in accordance with various embodiments of the present invention, at least two major discharge streams can be accommodated, narrowed and effectively discharged from the shredder.

Figure 12:
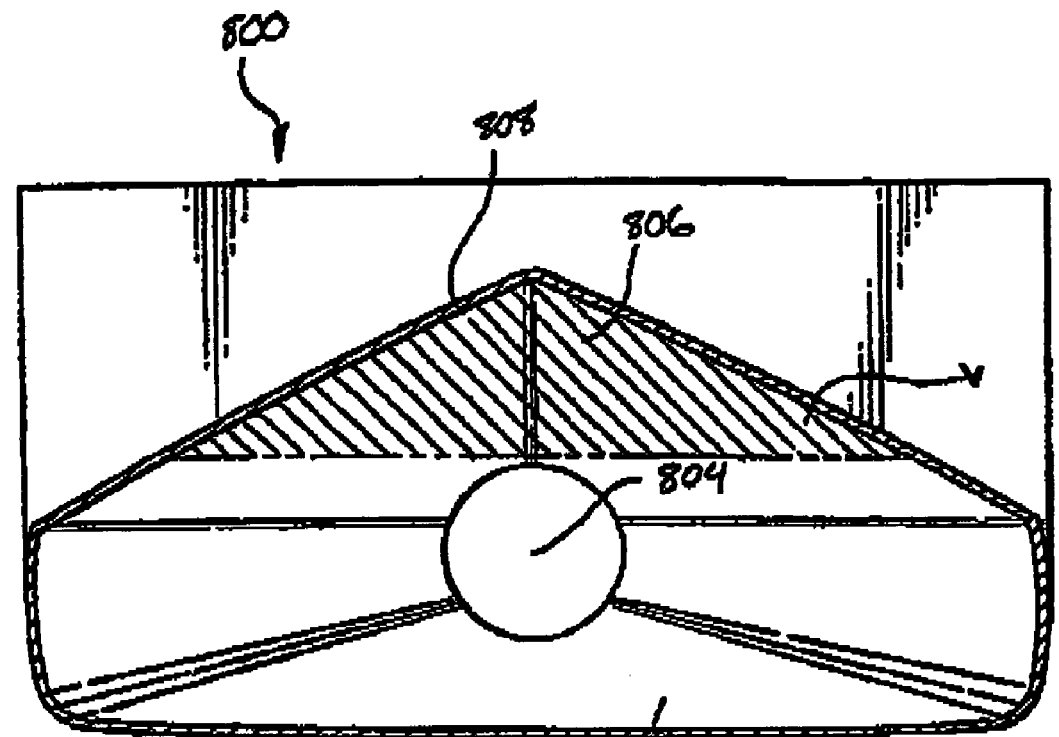
FIG. 12 is a cross sectional view taken on line 12-12 of FIG. 11.

Referring now to FIG. 12, depicted therein at 800 is a cross sectional view of an embodiment of a transition viewed looking in and up through an entrance 802 to a discharge port 804 in accordance with the present invention. The transition may have a cavity with a non-uniform cross section. The transition may also have an entrance that is non-uniform in cross-section. The entrance preferably has a region with a height that is greater where material comes off the drum at a slower speed. For instance, where the drum is tapered towards the center, the transition may have a region with a height that is greater towards the center. Where the drum is tapered towards the outsides, the transition will have a height that is greater towards the outsides. In the case where the drum is tapered both in the center and towards the outside, the height of the entry may vary accordingly, being higher along the narrower regions of the drum.

To vary the height of the entry or the cavity, the transition may include a rear wall 808 that is angled. An angular rear wall provides a transition with an extended void (v) or a region having an increased height. The extended void is shown as shaded region 806 which can be measured as the increase in area or volume over that provided by a plane normal to the sidewalls. The entrance, as shown, is pentangular, but may be any suitable shape.

Figure 13:
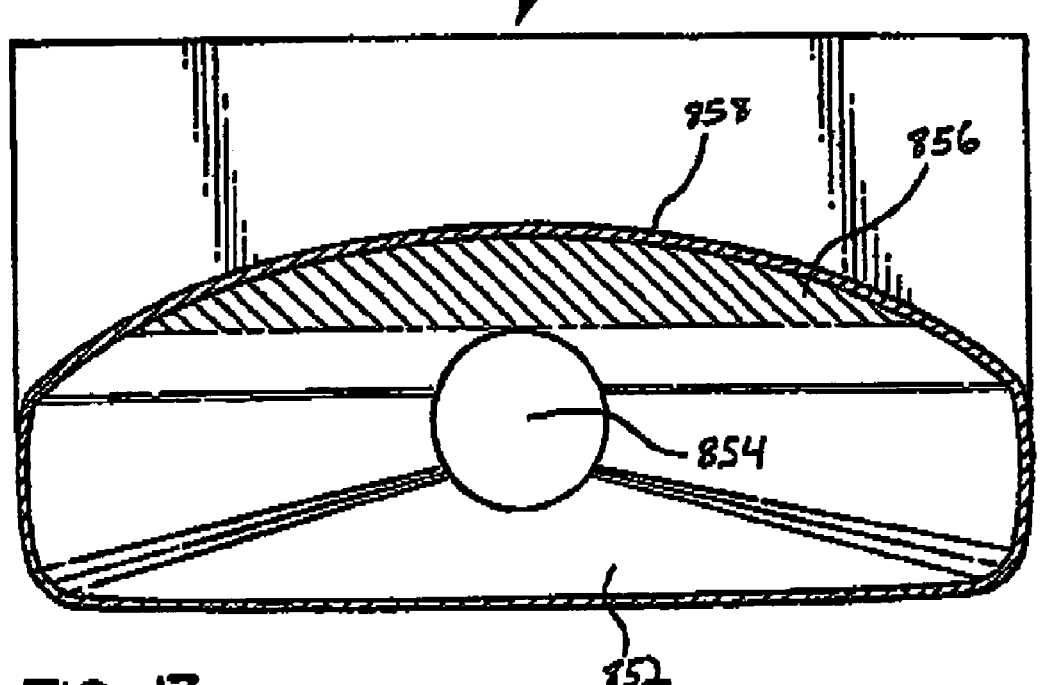
FIG. 13 is a view similar to FIG. 12, but showing a modified cross sectional configuration similar to FIG. 12 but showing a further embodiment.

Referring now to FIG. 13, shown therein is a cross sectional view of a transition 850 viewed looking in and up through an entrance 852 to a discharge port 854 in accordance with another embodiment of the present invention. The transition includes an entrance 852, an exit port 854 and an extended void 856 (shown in shaded). The extended void 856 may be provided by a rounded rear wall 858. A rounded rear wall is an angular wall with infinite angles.

Figure 14:
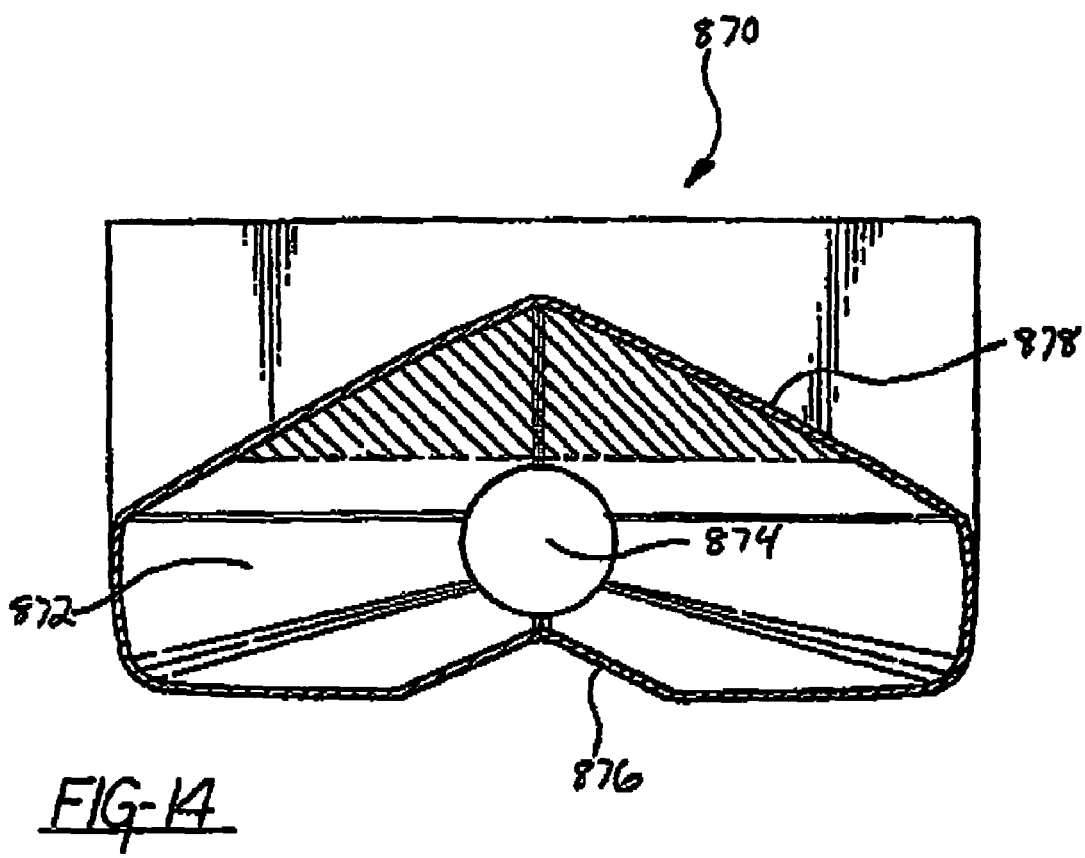
FIG. 14 is a modified cross sectional configuration of the invention.

Referring now to FIG. 14, shown therein is a cross sectional view of a transition 870 viewed looking in and up through an entrance 872 to a discharge port 874 in accordance with another embodiment of the present invention. The transition may have an angular front wall 876. The front wall may extend directly from the bellyband, or may be offset or set back. An angular rear wall 878 may also be provided. If an angular rear wall is provided, the shape of the angular front wall may substantially parallel that of the angular rear wall. The front wall may be substantially inverted v-shaped, which may coincide with the shape of the rear wall. If the front and rear walls parallel each other, the cross-section of the cavity may be uniform. The entry may also be uniform in cross-sectional (area). By providing an angular front wall, a narrower cavity can be provided that both accommodates the shape of the discharge stream while allowing it to be narrowed.

Figure 15:
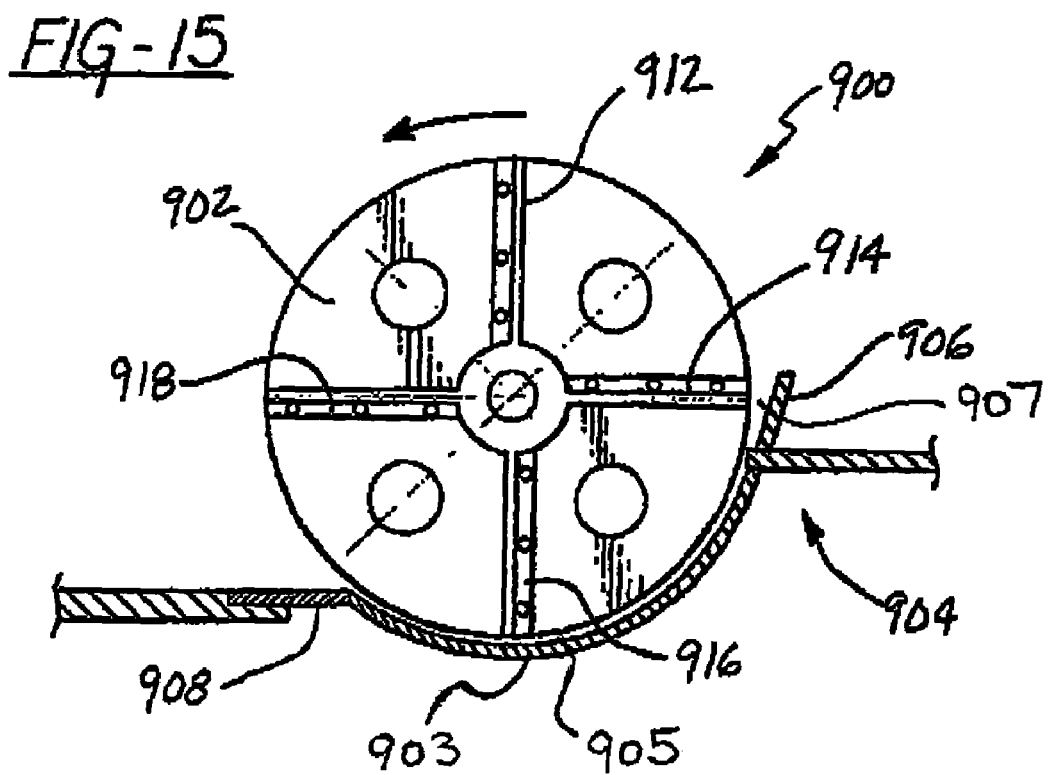
FIG. 15 is a cross sectional view showing another embodiment of the invention.

FIG. 15 is a cross sectional view of an embodiment of a shredder 900 having a cutting drum 902 and a discharge assembly 904 in accordance with the present invention. The discharge assembly 904 includes a bellyband 903 that begins at about the anvil(s) 908 and extends to about the transition 906. As shown in FIG. 15, the bellyband 903 provides a cavity 905 and the transition 906 has a larger cavity 907 than the cavity 905 of the bellyband. The bellyband preferably wraps the circumference of the cutting drum beginning from the anvil to 90-180 degrees. By having the bellyband extend 90 degrees or more, material may be carried to a relatively higher position on the drum before beginning separation, which may allow reduced collisions between the discharge stream and the walls of the transition.

To aid the drum in material discharge, one or more fan blades 912, 914, 916, 918 may be provided. As shown, the fan blades 912, 914, 916, 918 are straight l-brackets evenly spaced about the outer sides of the cutting drum and adapted to generate air currents when the drum rotates.

While the invention has been illustrated in detail in the drawings and the foregoing description, the same is to be considered as illustrative and not restrictive in character. For example the shredder of the present invention may be adapted for shredding tires, appliances, etc, with only slight or no modifications to the invention hereof. Therefore, it should be understood that only the preferred embodiments have been shown and described fully and that all changes and modifications that come within the spirit and scope of the invention are desired to be protected.

What is claimed is:

1. A shredder comprising: a housing; at least one hourglass shaped cutting drum having two bulbs, the cutting drum rotatably supported in the housing and having an imperforate outer surface whereby to keep reduced material externally of the drum; at least one cutting implement supported by each bulb of the cutting drum; a bellyband at least partially wrapping and conforming to the shape of the cutting drum; and a transition in communication with the bellyband, wherein the transition includes walls that form a substantially pentangular cavity.

2. The shredder of claim 1, wherein the drum shredder further includes an anvil shaped and positioned adjacent to the cutting drum, the anvil having an edge spaced a substantially uniform distance along the length of each cutting implement during drum rotation.

3. The shredder of claim 1, wherein the drum shredder further includes an anvil with a curved edge along its entire length.

4. The shredder of claim 2, wherein the anvil has a concave edge and the at least one cutting implement has a substantially straight edge, the anvil curved and spaced from the cutting drum to provide the substantially uniform distance along the length of each cutting implement during drum rotation.

5. The shredder of claim 1, wherein the transition has an entrance with an inner portion and an outer portion, the inner portion having a greater height than the outer portion.

6. The shredder of claim 1, wherein the transition has a cavity with an inner portion and an outer portion, the inner portion having a greater volume than the outer portion.

7. The shredder of claim 1, wherein the transition has a cross section transverse to the general travel of reduced material with a smaller cavity section or height on an outside portion of the transition and a larger cavity section or height in a center portion of the transition to allow material released into the center of the transition to be accelerated.

8. The shredder of claim 1, wherein the transition provides a cavity with a nonuniform, cross-section.

9. The shredder of claim 1, wherein the transition has an entrance with a shape that substantially inversely mirrors the shape of the bellyband.

10. A shredder comprising: a housing; at least one hourglass shaped cutting drum having two bulbs, the cutting drum rotatably supported in the housing and having an imperforate outer surface whereby to keep reduced material externally of the drum; at least one cutting implement supported by each bulb of the cutting drum; a bellyband at least partially wrapping and conforming to the shape of the cutting drum; and a transition in communication with the bellyband, wherein the transition has an angular front wall and a rear wall and the rear wall is substantially v-shaped or inverted v-shaped.

11. The shredder of claim 10, wherein the front wall extends from the bellyband and is substantially v-shaped or inverted v-shaped.

12. The shredder of claim 1, wherein the transition includes a set of sidewalls, a front wall and a rear wall that cooperate to provide a cavity with a void that extends past a plane normal to the sidewalls.

13. The shredder of claim 1, wherein each cutting implement has a pocket for carrying reduced material associated with it, each pocket being disposed in the surface of the cutting drum.

* * * * *

UNITED STATES PATENT AND TRADEMARK OFFICE
CERTIFICATE OF CORRECTION

| | | |
|---|---|---|
| PATENT NO. | : 7,513,449 B2 | Page 1 of 1 |
| APPLICATION NO. | : 10/237007 | |
| DATED | : April 7, 2009 | |
| INVENTOR(S) | : Gross et al. | |

It is certified that error appears in the above-identified patent and that said Letters Patent is hereby corrected as shown below:

Please insert the following on the front page of the patent, after the filing date Item -- 63 Related Application Data Continuation-in-part of Ser. No. 10/076,638, Feb. 16, 2002, Pat. No. 6,824,089. --

At page 1, column 1, line 13 after "and", please insert -- is a continuation-in-part application of and claims the benefit of the earlier filing date and priority --

Signed and Sealed this
Twentieth Day of December, 2011

David J. Kappos
*Director of the United States Patent and Trademark Office*